(12) United States Patent
Cunningham

(10) Patent No.: US 6,419,278 B1
(45) Date of Patent: Jul. 16, 2002

(54) AUTOMOTIVE HOSE COUPLING

(75) Inventor: Gail M. Cunningham, Oxford, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/583,420

(22) Filed: May 31, 2000

(51) Int. Cl.$^7$ .......................... F16L 35/00; F16L 49/00
(52) U.S. Cl. ...................... 285/256; 285/328; 285/382
(58) Field of Search .............................. 285/256, 328, 285/382, 252, 332.4

(56) References Cited

U.S. PATENT DOCUMENTS

| | | | |
|---|---|---|---|
| 4,671,542 A | 6/1987 | Juchnowski | 285/256 X |
| 5,044,671 A | 9/1991 | Chisnell et al. | 285/256 X |
| 5,370,425 A | 12/1994 | Dougherty et al. | 285/256 X |
| 5,417,461 A | 5/1995 | Dougherty et al. | 285/256 |
| 5,775,740 A | 7/1998 | Fukaya et al. | 285/256 |
| 6,095,571 A | 8/2000 | MacDuff | 285/256 |

*Primary Examiner*—Neill Wilson
(74) *Attorney, Agent, or Firm*—Reising, Ethington, Barnes, Kisselle, Learman & McCulloch, P.C.

(57) ABSTRACT

A pressure fluid conduit coupling fitting and method of making same, wherein the nipple tube fitting shank is made of specially grooved rigid material. A conventional elastomeric hose conduit having an open end telescopically receives the grooved fitting shank, and a conventional crimp-collar is sleeved over and shrunk-deformed onto the hose open end to permanently sealably secure the coupled conduit connection. An external circumferential surface of the fitting shank has one or more circumferentially continuous sharp edge external grooves of a shallow depth and predetermined width that are defined by the shank ribs formed between the grooves. The junction of the groove sidewalls with the respectively adjacent shank rib surface defines a circumferentially continuous sharp edge formed generally as a 90° junction of these groove sidewalls and rib surface, plus or minus a few degrees. These specially contoured sharp edge, shallow depth external grooves enhance the fluid sealing capacity (pressure rating) of the coupling connection while reducing the magnitude of collar shrink crimping required, and minimize the chances of hose damage because of over-crimping.

18 Claims, 3 Drawing Sheets

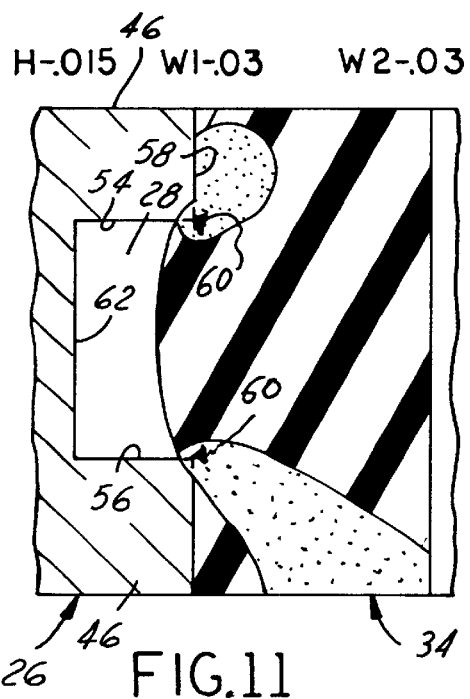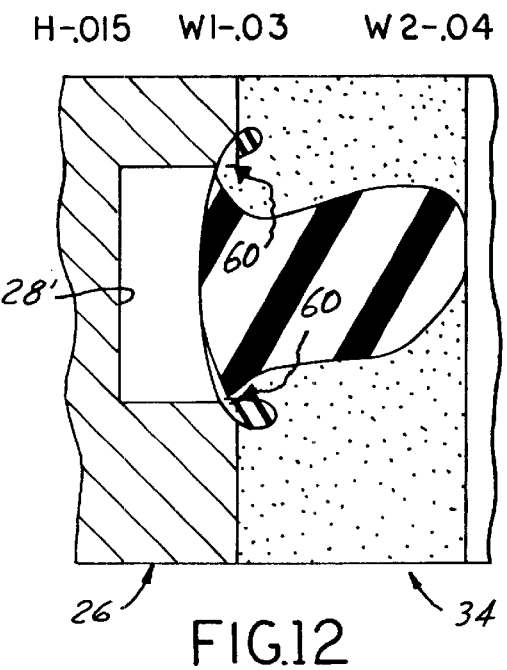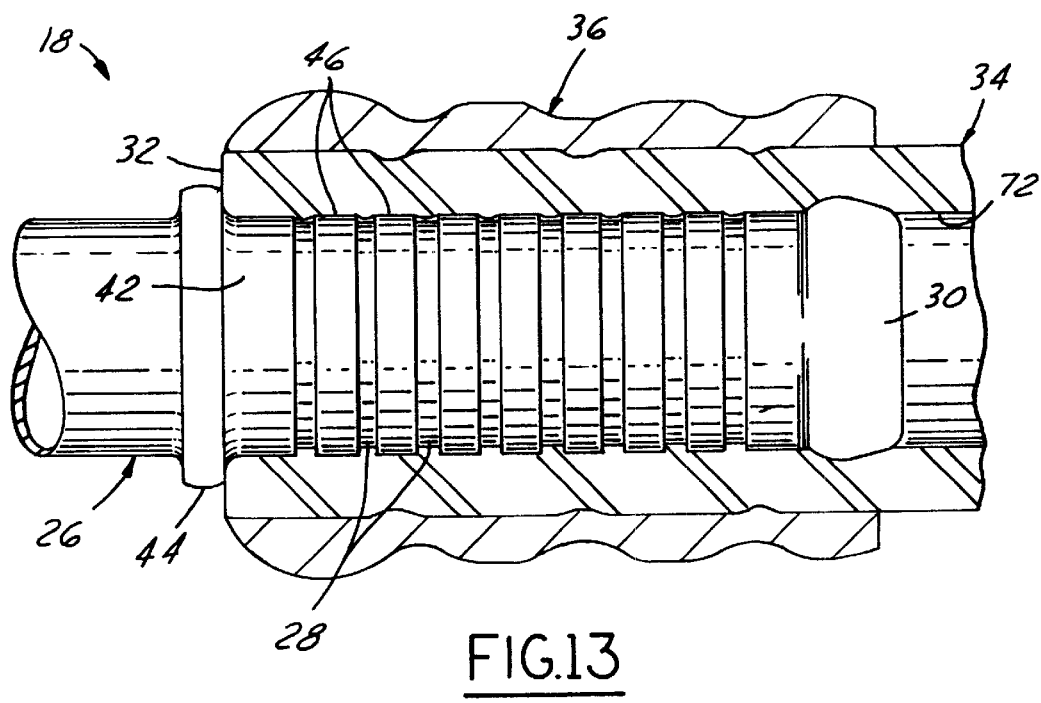

AUTOMOTIVE HOSE COUPLING

FIELD OF THE INVENTION

This invention relates to fluid sealing connections between rigid and flexible tubular fluid conduits, and more particularly to automotive hose couplings such as those used for connecting conduits in automotive power steering systems, and for coolant conduits for transmission and engine oil cooling systems, and the like.

BACKGROUND OF THE INVENTION

Crimp-type collar couplings used for sealingly telescopically coupling together rigid and flexible pressurized fluid conduits used in automotive power steering systems, and in transmission and engine cooler systems and the like, consist of a variety of designs. The sealing surface of the rigid tube at its nipple end, i.e., the end that is inserted into the open end of the flexible hose of the connected conduits so as to telescopically overlap therewith, may have a shank that is smooth or, alternatively a shank that has raised ribs, rolled ribs, or one of many other external. groove configurations. These different groove configurations are employed to enhance the sealing against fluid leakage between the flexible hose (usually made of a suitable elastomeric material), and the metal or other material used to construct the rigid tube. During the collar crimping procedure used in making the coupling, a generally cylindrical malleable metal shell is employed as a crimping collar and encircles the outside circumference of the hose. This collar is permanently circumferentially and radially-shrunk deformed to thereby apply mechanical radial compression pressure to the hose and thus builds up a permanent restraining stress for frictionally clamping the hose onto the tube nipple. This shrink force is also intended to squeeze the hose inner surface or hose innermost layer (in the case of a multilayer laminated hose) into any and all grooves or valleys of whatever rib design is provided on the nipple shank sealing surface. This adds a mechanical interlock structure reinforcing the frictional clamping to thereby assure that the assembly will remain intact against tensile forces tending to pull apart the flexible hose and rigid tube at their coupling.

One feature that prior coupling designs hitherto appear to have in common is that when a plurality of machined, cast, molded or rolled ribs or grooves are provided in the nipple shank exterior surface configuration, all sharp edges (where the radial sidewalls of each groove intersect the cylindrical nipple shank outer surface) are made "non-aggressive." This is done either by initial design for eliminating or modifying them by subsequently forming them into a generous radius, chamfer or bevel edge. These non-aggressive edges assure that the tubular flexible hose of the coupled conduits is not cut during the aforementioned collar crimping operation employed to render the coupling permanent and sealed tight.

Thus conventional thinking has been that if the tube were cut during crimping by the presence of such a sharp edge, premature failure of the coupling assembly would result. On the other hand, sharp edges hitherto have been used on the barbs of rigid tubular nipples that are used in power steering or oil cooler hose. Nevertheless where grooves or ribs, instead of barbs, have been used on a nipple shank to enhance a sealing surface function the sharp edges that might otherwise have been formed, such as by leaving square cut groove corners as initially formed by lathe-turned cuts, have been purposely removed or avoided for the aforementioned reasons.

OBJECTS OF THE INVENTION

Accordingly, an object of the present invention is to provide an improved automotive hose coupling employing one or more specially contoured external grooves to enhance the sealing between the telescopic junction of the nipple shank of a rigid tubular conduit and a flexible hose in conjunction with a crimping collar that is permanently shrunk-deformed to apply radial compression pressure to the hose, and which coupling is improved from the standpoint of maximizing its sealing pressure capability while not causing the flexible hose to be cut by the crimping forces produced between the inner surface of the hose and the outer surface of the grooved tube shank of the coupling.

Another object is to provide an improved method of making an improved coupling of the foregoing character that is economical, reliable and that reduces the amount of compressive force needed for crimping the collar on the hose to effect a good seal, thereby reducing the internal stresses in the hose and minimizing the chance of damage occurring because of over-crimping in constructing the coupling.

SUMMARY OF THE INVENTION

In general, and by way of summary description and not by way of limitation, the invention achieves one or more of the foregoing, as well as other objects, by providing a pressure fluid conduit coupling, and method of making same, wherein an improved nipple tube fitting conduit is made of specially grooved rigid material for use with a conventional elastomeric hose conduit having an open end that telescopically receives an open end of a shank of the nipple fitting, and is then permanently secured together by a conventional crimp-collar sleeved over and shrunk-deformed onto the hose open end. An external circumferential surface of the tubular shank of the fitting is provided with one or more circumferentially continuous sharp edge external grooves that are defined by the ribs formed between the grooves. At least two adjacent grooves of a plurality of such grooves are spaced axially from one another by a predetermined distance $W_2$. Each of these two grooves have a predetermined axial width dimension $W_1$ defined by generally radially extending axially spaced sidewalls facing one another. The bottom wall of each groove extends axially between the associated groove sidewalls and is formed at a radial depth represented by the predetermined dimension H, as measured from the external maximum outside diameter of the nipple shank ribs formed between such grooves. The external circumference of the fitting shank ribs between such grooves has a cylindrical contour of constant diameter. The junction of each of the groove sidewalls with the respectively adjacent shank rib surface defines a circumferentially continuous sharp edge formed generally as a 90° junction of these walls, plus or minus a few degrees.

Preferably for couplings designed for connecting conduits ranging in shank outside diameter from about 0.25 inches to about 0.75 inches, the groove depth dimension H is in the order of 0.008 inches, the groove width dimension $W_1$ is in the order of about 0.030 to about 0.035 inches, and the groove spacing dimension $W_2$ is in the order of about 0.060 to about 0.070 inches. However, improved results also can be obtained within a range of such dimensional parameters, e.g., the groove depth dimension H may range between about 0.004 inches to about 0.015 inches, the groove width dimension $W_1$ may range between about 0.025 inches to about 0.040 inches, and the groove spacing dimension $W_2$ may range from about 0.055 inches to about 0.070 inches. Preferably the number of the grooves in the plurality of grooves ranges from about four to eight, and the groove dimensions $W_1$, $W_2$ and H apply to all of such grooves and are uniform and constant from groove-to-groove.

Preferably the crimp-collar is crimped to permanently deform the same with a magnitude to create, in the hose inner surface area impinged by at least one of the sharp edge corners of the grooves, an internal stress in the hose up to about 700 psi. Also, the crimp-collar is preferably shrunk by an amount sufficient only to radially compress the thickness dimension of the wall of the flexible hose conduit, where the hose wall is encircled by the collar, to about 80 percent of its free state thickness.

BRIEF DESCRIPTION OF THE DRAWINGS

The foregoing as well as additional objects, features and advantages of the present invention will be better understood from the following detailed description of the best mode presently known to the inventor of making and using the invention, from the appended claims, and from the attached drawings (which are to engineering scale unless otherwise indicated), wherein:

DETAILED DESCRIPTION OF THE PREFERRED EMBODIMENTS

Figure 1:
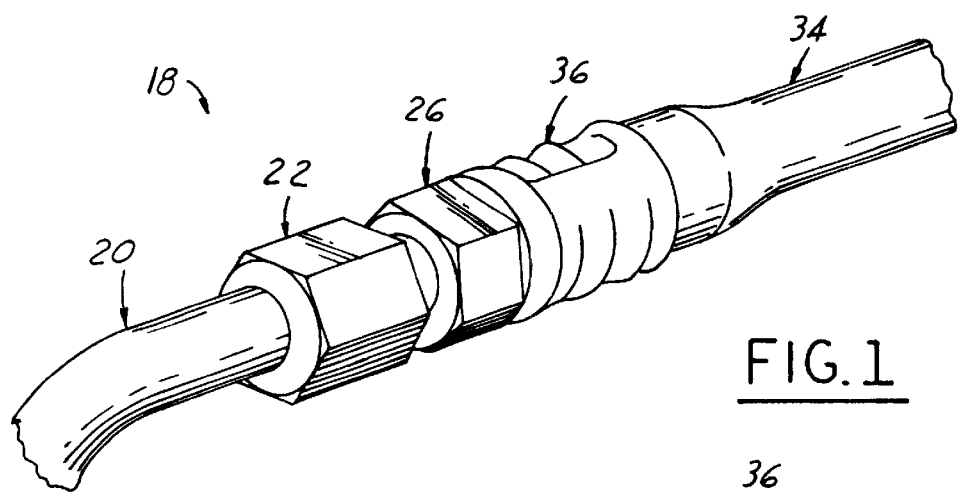
FIG. 1 is a fragmentary perspective view of a first embodiment of an automotive hose coupling constructed in accordance with the present invention.

Referring in more detail to the accompanying drawings, FIG. 1 illustrates a completed first embodiment coupling 18 constructed in accordance with the invention in which a conventional rigid tubular power steering fluid conduit 20, usually constructed of steel (e.g., 1008/1010), stainless steel, copper or brass material, is removably connected to a metal male connector fitting 26 by a conventional hex nut compression fitting 22 threadably received on a male threaded end 24 (FIG. 2) of fitting 26. A plurality of grooves 28 are provided on a tubular shank 42 of fitting 26 (FIG. 2) that are specially constructed in accordance with the invention. The rounded male nipple end 30 of shank 42 is telescopically inserted into the mating open end 32 of a flexible elastomeric hose conduit 34 and permanently secured to fitting 26 by a crimp-collar 36. Crimp-collar 36 is shown by way of example as a conventional triple bubble crimp-type collar constructed of malleable metallic material and shown in its crimped state , in FIGS. 1, 2, 4 and 13, as circumferentially and radially compressed.

Figure 2:
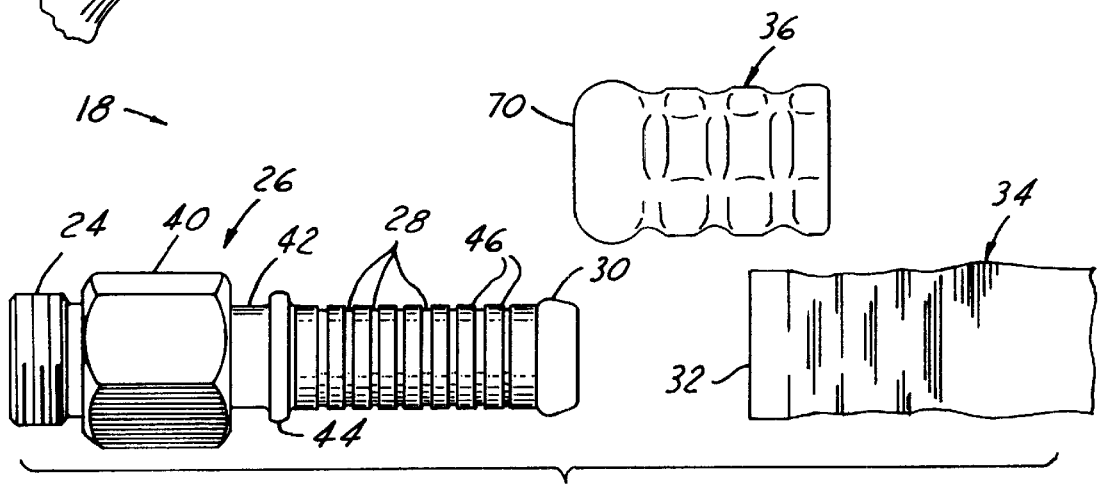
FIG. 2 is a fragmentary exploded view of the components of the coupling of FIG. 1.

Fitting 26 is shown complete in FIG. 2 and comprises, in addition to the externally threaded male end 24, an integral hex nut portion 40 and the cylindrical shank portion 42 that is provided with a hose stop flange 44 spaced closely adjacent nut portion 40. Shank 44 terminates at its axially open end at the tapered nipple open end 30 that is designed to facilitate telescopic insertion into the open end 32 of hose 34 in a conventional manner. Shank 42 between stop flange 44 and nose 30 is provided with the plurality of the special grooves 28, shown by way of example as being eight in number and defining therebetween the seven ribs 46.

Figure 8:
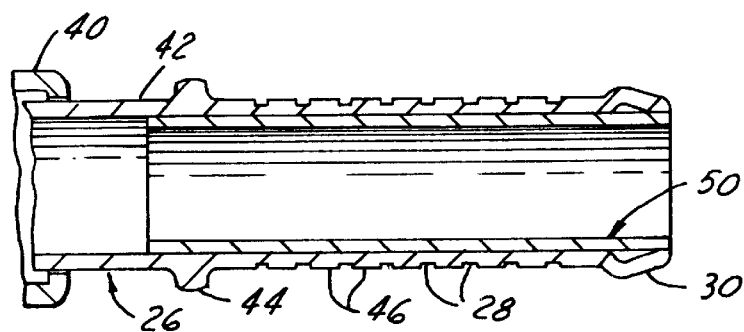
FIG. 8 is a cross sectional view taken on the line 8—8 of FIG. 5.
Figure 9:
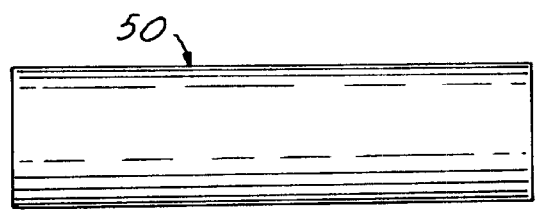
FIGS. 9 and 10 are respectively side elevational and end views of the reinforcing tube used in the subassembly of FIGS. 5–8.
Figure 10:
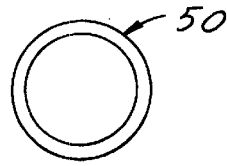

As shown in FIGS. 8, 9 and 10, fitting 26 is preferably a reinforced subassembly, a conventional cylindrical open ended metal reinforcing tube 50 being telescoped with a close clearance fit into shank 42 of fitting 26. Tube 50 is designed to be at least axially coextensive with the portion of fitting shank 42 that is axially overlapped in assembly with crimp-collar 36. Thus, as shown in FIG. 8, tube 50 is flush at its right hand end (as viewed in FIG. 8) with the end of shank nose 30, and its left hand end terminates just past the hose stop flange 44.

Figure 3:
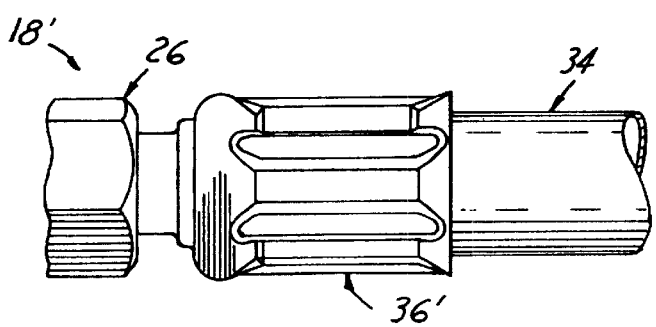
FIG. 3 is a fragmentary plan view of a second embodiment coupling of the invention modified only in that it utilizes a conventional flat-type crimp collar.
Figure 4:
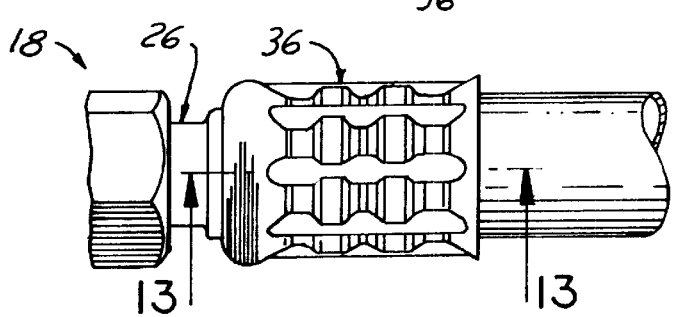
FIG. 4 is a fragmentary plan view of the coupling construction of FIGS. 1 and 2 of the first embodiment.
Figure 5:
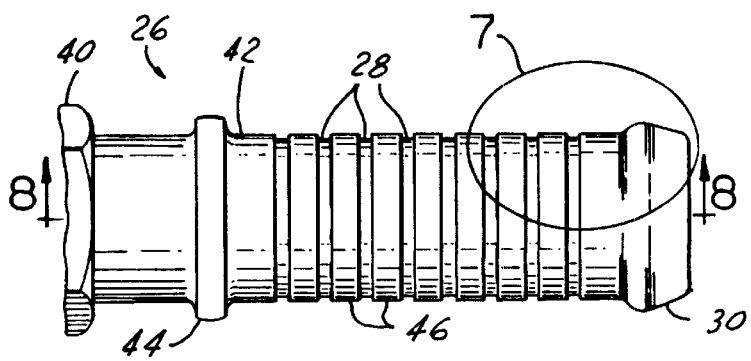
FIG. 5 is a fragmentary elevational view of the subassembly of the shank nipple end of the rigid tube, utilized in the embodiments of FIGS. 1–4, with an interior reinforcing tube, this reinforced tubular shank subassembly being shown by itself prior to insertion into a hose and prior to being crimped.
Figure 6:
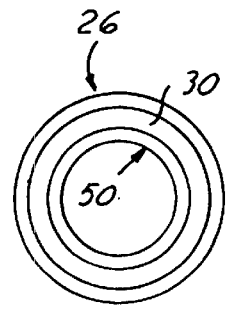
FIG. 6 is an end view looking at the right hand end of the subassembly of FIG. 5, as viewed in FIG. 5.

The second embodiment coupling construction 18' shown in FIG. 3 is identical to coupling construction 18 except that the crimp-collar 36' is of the conventional flat crimp-type instead of the triple bubble crimp-type ("TBC") coupling 36.

Figure 7:
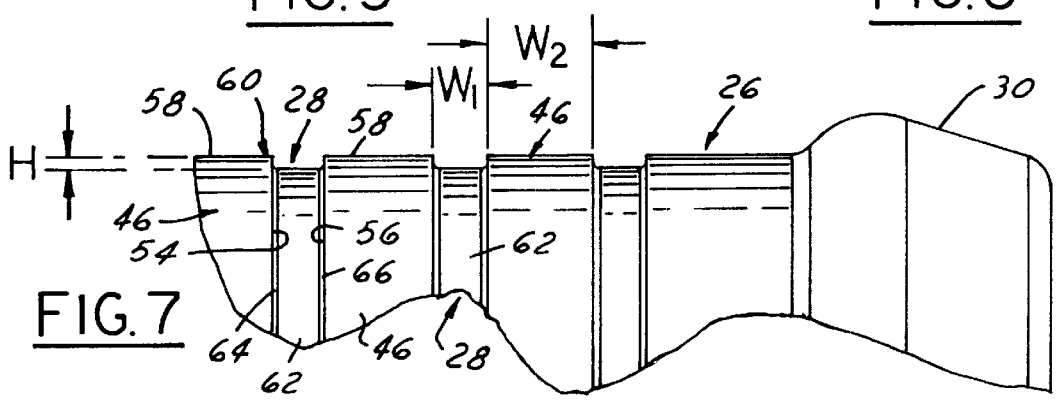
FIG. 7 is a fragmentary view of the portion of FIG. 5 encompassed by the circle labeled 7 therein and shown on a greatly enlarged scale thereover.

In accordance with a principal feature of the present invention, and as best seen in the enlarged view of FIG. 7, each of the fitting shank grooves 28 is basically a "square-cut" groove. By way of example, each groove 28 may be form-tool machined in the metal material of the shank 42 of fitting 26 so as to have a predetermined cross sectional configuration in a plane defined by the central axis and a radius of shank 42. In the illustrated example each groove 28 is defined by a pair of axially opposed radially extending sidewalls 54 and 56 that intersect the outer cylindrical peripheral surface 58 of an associated mutually adjacent rib 46 at a right angle to thereby define a 90° sharp edge 60. Edge 60 is thus a square-shoulder-type edge purposely unaltered from the lathe-turned machine cut used in forming groove 28, instead of such an aggressive groove edge 60 then being radiused, chamfered or beveled as in prior practice. Preferably the bottom wall surface 62 of each groove 28 is cylindrical and concentric with the cylindrical peripheral rib surface 58. Likewise, preferably the junction of each groove sidewall 54, 56 with the groove bottom surface 62 is formed as a fillet junction, shown as fillets 64 and 66 in FIG. 7.

In addition to the junction of grooves 28 with ribs 46 being formed as "sharp edges" 60, and as best seen in FIG. 7, the invention is also characterized by a further feature, namely the predetermined dimensional relationship of grooves 28 with ribs 46 as to the width dimension $W_1$ between the groove sidewalls 54 and 56 as measured axially of shank 42, the spacing between each adjacent pair of grooves 28 which defines the width dimension $W_2$ of each rib 46 also as measured axially of fitting 26, and the groove depth denoted H in FIG. 7, which is the dimension measured radially of shank 42 between the outside diameter of each rib 46 and the outside diameter of groove bottom wall 62. Exemplary values for these dimensional parameters $W_1$, $W_2$ and H have been determined initially by finite element analysis (FEA) and verified by prototype testing, as described in more detail hereinafter.

To assemble and construct coupling 18, utilizing the components described hereinabove, an undeformed crimp-collar 36 is first sleeved over the open end of the undeformed hose 34, so that the fitting end 70 of collar 36 is preferably flush with the open end 32 of hose 34. It is to be understood that collar 36, as well as hose 34 as shown in FIG. 2, are shown after crimp deformation of these respective components.

Figure 13:
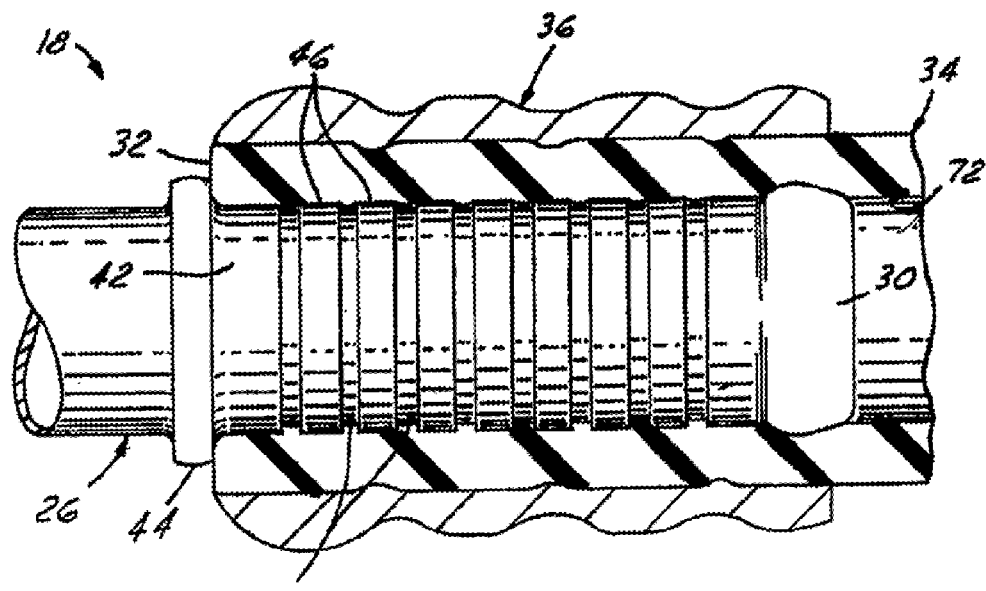
FIG. 13 is a fragmentary part elevational and part cross-sectional view taken on the line 13—13 of FIG. 4.

Then fitting 26 is telescopically inserted, nose end first, into open end 32 of hose 34 until hose end 32 abuts hose stop flange 44 of fitting 26, as best seen in FIG. 13. Then collar 36 is crimped in a conventional fashion using conventional crimping equipment, so as to circumferentially and radially shrink-deform the malleable material of collar 36 a given amount to thereby permanently deform the same into a permanently set configuration indicated somewhat diagrammatically in FIG. 13, as well as in FIGS. 1, 2 and 4. This shrink-deformation of collar 36 thus radially compresses that portion of hose 34 telescopically axially overlapping fitting 26 and forces the wall inner surface 72 of hose 34 to bulge into and thereby partially penetrate each of the grooves 28. This mechanical interengagement of hose 34 with groove ribs 46, in addition to the frictional grip of wall 72 on the external periphery of the ribbed shank 42, provides a very strong joint that resists axial separation of fitting 26 from hose 34 even under tensile forces that typically exceed the tensile stress limit of hose 34.

From the standpoint of reduced fluid leakage and enhanced sealing of highly pressurized fluid through the coupled junction of the conduits 20 and 34 via coupling 18, it has been found that surprising and substantially improved results are obtained from sharp groove edges as compared to various ribbed and grooved configurations that use non-aggressive groove edge surfaces where they are engaged by the encircling rubber hose, as by the prior practice of putting radii, chamfers and/or bevels on all sharp edges remaining from groove formation, if such be present. The invention also features a groove depth H that is relatively shallow so as not to impart severe internal stresses in the rubber material of hose 34 that could cause it to cut or tear on one or more of the sharp edges 60. Both FEA analysis and empirical testing to date have shown the "sharp-edge groove" design of the invention to be far superior to the rib shank coupling fittings of prior art constructions.

More particularly, in the development of the present invention, an FEA study was conceived and conducted to determine if theoretically improved results could be obtained from applying the foregoing principles of the invention. The goal was to maximize the sealing pressure capability of the coupling joint, while not creating internal stresses in hose 34 severe enough to cause it to cut. Accordingly a Finite Element Analysis (FEA) was created to evaluate the stresses and sealing pressures on a coupled hose using grooves as described previously, namely a plurality of equally axially spaced grooves 28, to create a better seal between the external surface of metal shank 42 of fitting 26 and the inner diameter wall surface 72 of hose 34. The groove width $W_1$, groove depth H and spacing $W_2$ between the grooves, i.e., the axial width of each rib 46 denoted $W_2$ in FIG. 7, were correlated with one another and then varied as between data runs in order to determine the optimum design that would provide maximum sealing pressure without severely stressing rubber tube 34. From this analysis, preferred combinations were selected and parts were manufactured for prototype testing. Tests were run to prove out the design, as well as determine how the parts compare to existing designs. These test results have shown the design of the invention to provide surprisingly superior results.

An additional benefit that was discovered is that the hose does not have to be compressed as much during crimping to achieve a good seal with the design of the invention. This, in turn, further reduces the internal stresses in the hose, and minimizes the chance of damage occurring because of over-crimping.

Figure 11:
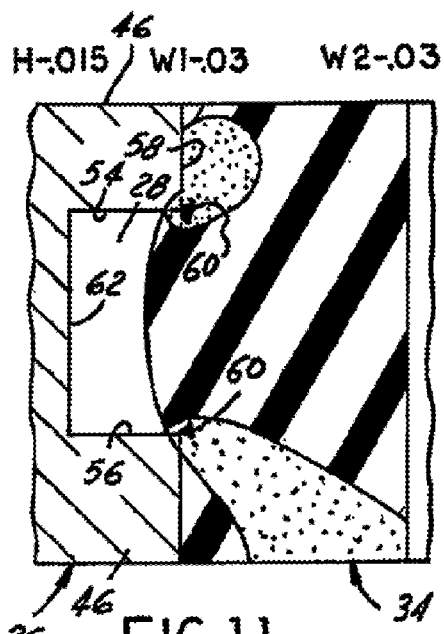
FIG. 11 is a greatly enlarged fragmentary diagrammatic view as computer drawn on the basis of finite element analysis (FEA) of a preferred groove construction of the invention.
Figure 12:
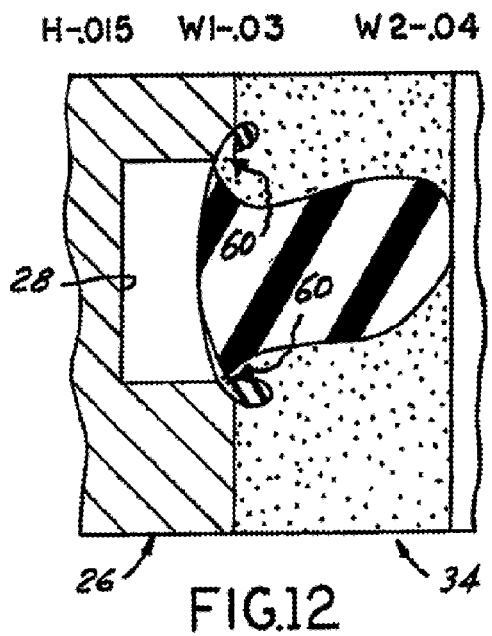
FIG. 12 is a view similar to FIG. 11 also showing a computer generated diagram based on FEA analysis of a groove construction employing slightly different dimensional parameters than those of FIG. 11.

A computer print-out of two of the dimensional combinations are shown semi-diagrammatically in FIGS. 11 and 12, the sample dimensions for H, $W_1$, and $W_2$ being labeled above each figure (in inches). As indicated above, several variations of the sizes of the grooves and their spacing were analyzed. The analysis was also done on a hose with no grooves cut in the fitting 26. To keep consistency, each theoretical crimp variation in the crimp collar was compressed a distance corresponding to 80% of the free-state height (wall thickness radially of the hose) of the hose. The values for the hose material were taken from specifications for a material identified as a fluoroelastomer 01-560, which has a specified failure limit of 1560 psi of stress. Due to difficulty encountered in extracting accurate values from the cross-sections, which in turn was due to the fact that the FEA software analysis has a tendency to stretch across the sharp corners of the grooves, the numbers of the nearest finite elements that did not stretch across the corners were used in the analysis problem. Indeed, the software would not run the problems when a radius was inputted to the data on the corners of the grooves.

Using as a base point data that was calculated and analyzed on a fitting tube shank with no grooves at all, the theoretical results from the stress plot showed that only 332 psi of stress is concentrated at the maximum crimped area of the collar on the ungrooved tube. The sealing plot showed that the seal on the smooth tube shank can only sealably withstand up to 197 psi of fluid pressure.

However, for fittings 26 constructed with the sharp edge grooves 28 and ribs 46, as described hereinabove, the following theoretical results were obtained from some of this FEA analysis:

| No. | H Dimension (inches) | $W_1$ Dimension (inches) | $W_2$ Dimension (inches) | Stress (psi) | Sealing Pressure at Corner of Grooves |
|---|---|---|---|---|---|
| 1 | .000 | .000 | .000 | 332 | 197 |
| 2 | .005 | .005 | .030 | 540 | 295 |
| 3 | .005 | .005 | .040 | 303 | 314 |
| 4 | .005 | .010 | .030 | 303 | 359 |
| 5 | .005 | .010 | .040 | 872 | 328 |
| 6 | .005 | .015 | .030 | 791 | 302 |
| 7 | .005 | .015 | .040 | 1100 | 330 |
| 8 | .010 | .005 | .030 | 540 | 295 |
| 9 | .010 | .005 | .040 | 702 | 329 |
| 10 | .000 | .010 | .030 | 936 | 359 |
| 11 | .010 | .010 | .040 | 872 | 369 |
| 12 | .010 | .015 | .030 | 948 | 453 |
| 13 | .010 | .015 | .040 | 1320 | 440 |
| 14 | .015 | .005 | .030 | 540 | 295 |
| 15 | .015 | .005 | .040 | 702 | 395 |

-continued

| No. | H Dimension (inches) | $W_1$ Dimension (inches) | $W_2$ Dimension (inches) | Stress (psi) | Sealing Pressure at Corner of Grooves |
|---|---|---|---|---|---|
| 16 | .015 | .010 | .030 | 1400 | 539 |
| 17 | .015 | .010 | .040 | 1450 | 492 |
| 18 | .015 | .015 | .030 | 948 | 553 |
| 19 | .015 | .015 | .040 | 1100 | 550 |
| 20 | .015 | .005 | .050 | 424 | 431 |
| 21 | .015 | .005 | .060 | 387 | 305 |
| 22 | .015 | .010 | .050 | 584 | 591 |
| 23 | .015 | .010 | .060 | 549 | 513 |
| 24 | .015 | .015 | .050 | 716 | 728 |
| 25 | .015 | .015 | .060 | 517 | 691 |
| 26 | .015 | .020 | .030 | 777 | 796 |
| 27 | .015 | .020 | .040 | 775 | 799 |
| 28 | .015 | .025 | .030 | 672 | 709 |
| 29 | .015 | .025 | .040 | 668 | 669 |
| 30 | .015 | .030 | .030 | 955 | 934 |
| 31 | .015 | .030 | .040 | 1026 | 1280 |
| 32 | .020 | .010 | .040 | 437 | 468 |
| 33 | .020 | .010 | .050 | 467 | 500 |
| 34 | .020 | .015 | .040 | 522 | 562 |
| 35 | .020 | .015 | .050 | 716 | 672 |
| 36 | .020 | .020 | .040 | 775 | 738 |
| 37 | .020 | .020 | .050 | 742 | 694 |

It will be seen from the foregoing FEA study results that when the groove depth (H) is 0.015 inches and the groove width ($W_1$) is 0.030 inches (runs Nos. 30 and 31), the sealing pressure capability is the greatest (i.e., 934 and 1280 psi). It also appears that as the space ($W_2$) between the grooves increases, the sealing pressure capability increases (again, see runs nos. 30 and 31). Based on these results, a prototype was constructed using a groove spacing of approximately 0.060 inches, because it was calculated from the FEA results that the sealing pressure might well increase even more by increasing the figure from 0.040 to 0.060. Since the groove depth (H) is a parameter that seems to have much less effect on sealing pressure obtained, for a theoretical FEA prototype test sample this dimension was reduced to 0.008 inches in order to further reduce the chances of cutting the inner wall 72 of hose 34. The FEA study using these modified parameters provided the following surprisingly improved results:

| No. | H Dimension (inches) | $W_1$ Dimension (inches) | $W_2$ Dimension (inches) | Stress (psi) | Sealing Pressure at Corner of Grooves |
|---|---|---|---|---|---|
| 38 | 0.008 | 0.032 | 0.065 | 646 | 1020 |

Prototype samples for actual testing were then constructed using run No. 38 parameters and both types of collars 36 and 36'. Both crimp styles gave superior test results when compared to competitive commercial coupling construction. A difference was observed in subsequent testing in the results as between these two styles of crimp-collars, i.e., the flat crimp style proved better. However, it is believed that the TBC style may prove equal or work very well with a different hose construction.

A thermal cycling test was suspended at 20 cycles with no leakage evident on any of the designed couplings constructed according to the aforementioned parameters.

Based on the results of the foregoing FEA analysis, data and study, it is theoretically concluded that the depth H of the grooves is found to be not as significant a factor as the width $W_1$ of the groove or the distance $W_2$ between grooves.

The analysis also indicates a finding that for a given groove depth, the wider the groove the higher the stresses will be, and therefore the sealing pressures achieved will be higher. Thus it is evident that runs nos. 30 and 31 using the 0.03 inch groove width ($W_1$) display an extremely high amount of stress as compared to the rest of the cross-sections. On the other hand, the groove widths of 0.010 inches and 0.005 inches show adequate theoretical sealing values while at the same time not creating a great deal of internal stress in the hose. On the other hand, run No. 38 using a groove width of 0.032 inches but a reduced groove depth (H) of 0.008 inches while increasing the groove spacing ($W_2$) to over 0.060 inches resulted in providing about five times the sealing pressure of a smooth tube while only doubling the internal hose stresses.

Thus, from the foregoing description and appended drawings as referenced therein, it will now be apparent to those skilled in the art that a coupling construction 18, 18' in accordance with the foregoing disclosure amply fulfills the aforestated objects and provides many features and advantages over the prior art. The simple labyrinth sealing groove design of the invention using square grooves cut into the surface of the metal tube, so as to provide sharp edge intersections of the radial groove walls with the cylindrical surface of the mutually adjacent flanking ribs thus generated on the tube shank, greatly increases the fluid sealing pressure capacity of the coupling. Nevertheless, at the same time cutting the grooves only to a shallow depth does not allow the rubber tube to be over-stressed so as to cause cracking or cutting of the hose inner diameter. The amount of metal needed to be removed in lathe-turning is also reduced. A further benefit is that the hose crimp-collar does not have to be compressed as much during crimping as in standard practice in order to achieve a good seal utilizing the groove design of the invention. This in turn further reduces the internal stresses in the hose, further minimizes the chance of damage occurring because of over-crimping and minimizes the effect of creep because the rubber is compressed along the entire grooved surface area. Moreover, when the grooves are formed by lathe cut turning, the need for radiusing, beveling or chamfering each of the edges of the cut in the manufacturing operation is eliminated.

Of course, it also will be understood that the principles of the invention can be applied to equivalent coupling constructions in which the components are varied from the examples disclosed. For example, fitting 26 may be made of other rigid material such as high-strength injection-molded reinforced plastic material that is glass filled, and various suitable metallic materials that may be cast and/or machined. The elastomeric conduit 34 provided with coupling 18, 18' may be one of a variety of conventional high-pressure elastomeric hose constructions. Preferably the hose material has a hardness range of 70 to 80 durometer and a tensile strength of at least 1000 psi. Typical application fluid working pressures up to about 300 psi are presently the design working criteria for the disclosed coupling constructions. The crimping collars 36 and 36' may be any of the standard malleable metal crimping collars conventionally employed in making crimp-couplings for flexible hose conduits. It is also believed that the angulation of groove sidewalls 54 and/or 56 may also be varied from their 90° intersection with the cylindrical surface 58 of the mutually adjacent ribs 46, as by providing a groove sidewall-rib surface angular intersection variation ranging from about (+)5°>90° to about (−)5°<90° without thereby substantially impairing the improved results provided by the invention, provided that such modified groove edge intersection remains "aggressive", i.e., a sharp linear line-to-line intersection defining the groove edge configuration lying in a plane defined by the tube axis and any radius extending from the same.

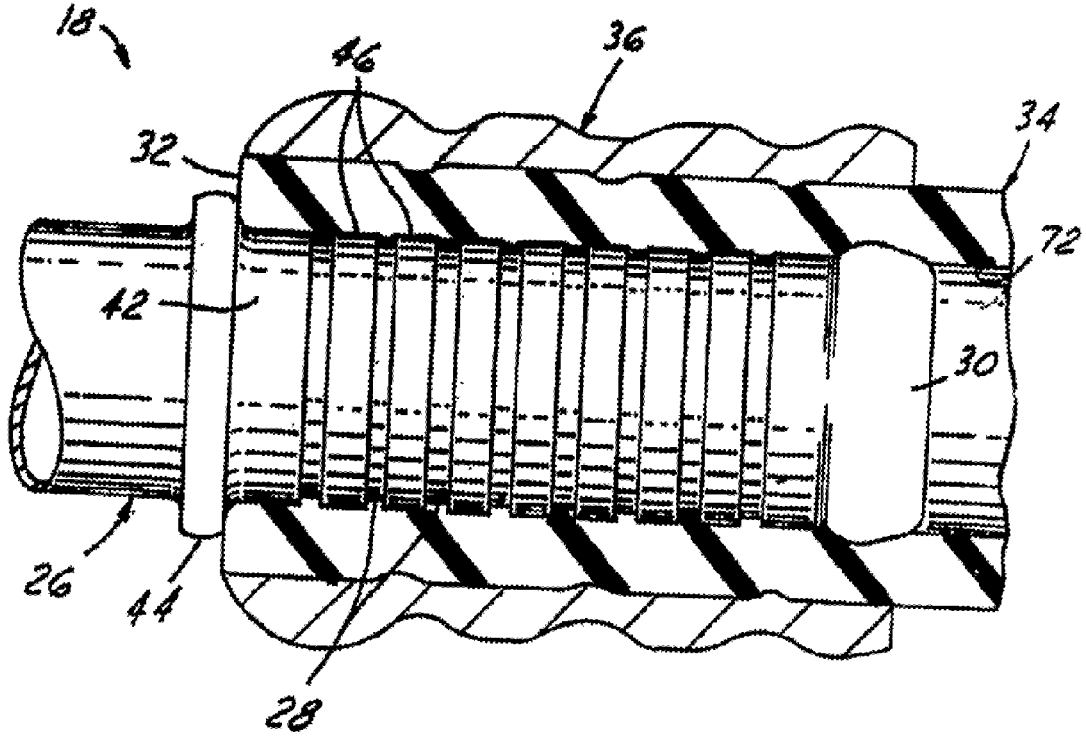

What is claimed is:

1. In a pressure fluid conduit coupling comprising a nipple tube fitting having a shank with an external maximum outside diameter in the range of about 0.25 inches to about 0.75 inches and being made of rigid material, an elastomeric hose having an interior wall surface of said elastomeric material and an open end adapted to telescopically receive an open end of said nipple tube fitting shank with the external circumferential surface of said nipple tube fitting shank engaging said interior wall surface of said hose, and a crimp-collar sleeved over and shrunk-deformed onto said hose open end and being generally axially coextensive with the axial extent of overlap of said hose telescopically on said nipple tube fitting shank, the improvement in combination therewith wherein said nipple tube fitting shank is provided on its external circumferential surface with a plurality of external circumferentially continuous locking and sealing ribs and grooves including first and second grooves spaced axially from one another by a predetermined distance $W_2$ occupied by an intervening one of said ribs, each of said first and second grooves having an axial width dimension $W_1$, and each of said first and second grooves having a bottom wall formed at a radial depth represented by the predetermined dimension H, as measured from the external maximum outside diameter of said external circumferential surface of said nipple fitting shank in the space between said first and second grooves, each of said first and second grooves being defined by generally radially extending axially spaced sidewalls facing one another and a bottom wall extending axially between the associated groove sidewalls, said external circumferential surface of said nipple tube rib between said first and second grooves having a cylindrical contour of constant diameter, and wherein the junction of each of said groove sidewalls with said external circumferential surface of said nipple tube fitting shank rib defines a circumferentially continuous sharp edge formed by an unaltered lathe cut turning and configured generally as a 90 degrees junction plus or minus about 5 degrees characterized as a sharp linear line-to-line intersection lying in a plane defined by the tube fitting shank axis and any radius extending from the same, and wherein said groove depth dimension H ranges between about 0.004 inches to about 0.015 inches, wherein said groove width dimension $W_1$ ranges between about 0.025 inches to about 0.040 inches, and wherein said groove spacing dimension $W_2$ ranges from about 0.055 inches to about 0.070 inches.

2. The coupling of claim 1 wherein said groove depth dimension H is in the order of about 0.008 inches, said groove width dimension $W_1$ is in the order of about 0.030 to about 0.035 inches, and said groove spacing dimension $W_2$ is in the order of about 0.060 to about 0.070 inches.

3. The coupling of claim 1 wherein said crimp collar is crimped to permanently deform the same with a magnitude to create at its surface area impinged by at least one of said sharp edge corners of grooves an internal stress in said hose in the range of about 387 psi up to about 700 psi.

4. The coupling of claim 1 wherein the number of the grooves in said plurality of grooves ranges from four to eight.

5. The coupling of claim 4 wherein said groove dimensions $W_1$, $W_2$ and H apply to all of said plurality of grooves and are uniform and constant from groove-to-groove.

6. The coupling of claim 4 wherein said plurality of grooves comprises at least two of said grooves having the same $W_1$, $W_2$ and H dimensions.

7. The coupling of claim 4 wherein said groove dimensions $W_1$, $W_2$ and H apply to all of said plurality of grooves.

8. The coupling of claim 3 wherein said crimp-collar is shrunk by an amount sufficient only to radially compress the thickness dimension of the wall of said hose, where encircled by said collar, to about 80 percent of its free state thickness.

9. The coupling of claim 1 wherein said groove width dimension $W_1$ is about 0.032 inches, said groove spacing dimension $W_2$ is about 0.65 inches, and wherein said groove depth dimension H is about 0.008 inches.

10. The coupling of claim 9 wherein said crimp-collar is of the flat crimp type.

11. In a pressure fluid conduit coupling comprising a nipple tube fitting having a shank made of rigid material, an elastomeric hose having an interior wall surface of said elastomeric material and an open end adapted to telescopically receive an open end of said nipple tube fitting shank with the external circumferential surface of said nipple tube fitting shank engaging said interior wall surface of said hose, and a crimp-collar sleeved over and shrunk-deformed onto said hose open end and being generally axially coextensive with the axial extent of overlap of said hose telescopically on said nipple tube fitting shank, the improvement in combination therewith wherein said nipple tube fitting shank is provided on its external circumferential surface with a plurality of external circumferentially continuous locking and sealing ribs and grooves including first and second grooves spaced axially from one another by a predetermined distance $W_2$ occupied by an intervening one of said ribs, each of said first and second grooves having an axial width dimension $W_1$, and each of said first and second grooves having a bottom wall formed at a radial depth represented by the predetermined dimension H, as measured from the external maximum outside diameter of said external circumferential surface of said nipple fitting shank in the space between said first and second grooves, each of said first and second grooves being defined by generally radially extending axially spaced sidewalls facing one another and a bottom wall extending axially between the associated groove sidewalls, said external circumference of said nipple tube fitting shank rib between said first and second grooves having a cylindrical contour of constant diameter, and wherein the junction of each of said groove sidewalls with said external circumferential surface of said nipple tube fitting shank rib defines a circumferentially continuous sharp edge configured generally as a 90 degrees junction plus or minus about 5 degrees characterized as a sharp linear line-to-line intersection lying in a plane defined by the tube fitting shank axis and any radius extending from the same.

12. The coupling of claim 11 wherein said groove depth dimension H ranges between about 0.004 inches to about 0.015 inches, wherein said groove width dimension $W_1$ ranges between about 0.025 inches to about 0.040 inches, and wherein said groove spacing dimension $W_2$ ranges from about 0.055 inches to about 0.070 inches.

13. The coupling of claim 12 wherein said nipple tube fitting shank has an external maximum outside diameter in the range of about 0.25 inches to about 0.75 inches, said sharp edge is formed by an unaltered lathe cut turning, said groove depth dimension H is in the order of about 0.008 inches, said groove width dimension $W_1$ is in the order of about 0.030 to about 0.035 inches, and said groove spacing dimension $W_2$ is in the order of about 0.060 to about 0.070 inches.

14. The coupling of claim 13 wherein said crimp collar is crimped to permanently deform the same with a magnitude to create at its surface area impinged by at least one of said sharp edge corners of grooves an internal stress in said hose in the range of about 387 psi up to about 700 psi.

15. The coupling of claim 14 wherein the number of the grooves in said plurality of grooves ranges from four to eight, and wherein said groove dimensions $W_1$, $W_2$ and H apply to all of said plurality of grooves and are uniform and consistent from groove-to-groove.

16. The coupling of claim 15 wherein said crimp-collar is shrunk by an amount sufficient only to radially compress the thickness dimension of the wall of said hose, where encircled by said collar, to about 80 percent of its free state thickness.

17. The coupling of claim 16 wherein said groove width dimension $W_1$ is about 0.032 inches, said groove spacing dimension $W_2$ is about 0.65 inches, and wherein said groove depth dimension H is about 0.008 inches.

18. A method of constructing a pressure fluid conduit coupling tubular fitting having a nipple tube conduit shank made of rigid material and adapted for use in coupling a rigid pressure fluid conduit to an elastomeric pressure fluid hose having an opening at one end adapted to telescopically receive the open end of said nipple tube conduit shank and utilizing a crimp-collar adapted to be sleeved over and permanently shrunk deformed onto the hose end, said method comprising the steps of:

(a) forming a circumferentially continuous external groove in said rigid material of said fitting nipple tube conduit shank as a generally square groove recessed into the external annular surface of said nipple conduit shank and configured to provide sharp edges at the intersection of a pair of mutually facing groove sidewalls with such external annular surface of the tube conduit shank.

(b) forming said groove shallow in depth so that when the hose is crimp-clamped by the collar onto the nipple conduit shank the hose is not over stressed to thereby avoid cracking or cutting of the hose at its inner diameter portion, and (c) varying the groove width and depth to determine the optimum selection of these parameters in combination for given application to thereby provide maximum sealing pressure without severely stressing the elastomeric hose.

* * * * *

UNITED STATES PATENT AND TRADEMARK OFFICE
CERTIFICATE OF CORRECTION

PATENT NO. : 6,419,278 B1
DATED : July 16, 2002
INVENTOR(S) : Gail M. Cunningham It is certified that error appears in the above-identified patent and that said Letters Patent is hereby corrected as shown below:

Column 10,
Line 10, after "about" delete "0.65" and insert -- 0.065 --.

Column 11,
Line 16, after "about" delete "0.65" and insert -- 0.065 --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,419,278 B1
APPLICATION NO. : 09/583420
DATED : July 16, 2002
INVENTOR(S) : Gail M. Cunningham It is certified that error appears in the above-identified patent and that said Letters Patent is hereby corrected as shown below:

The title page should be deleted to appear as per attached title page.

The sheet of drawings consisting of figures 11-13 should be deleted to appear as per attached figures 11-13.

Signed and Sealed this

Twentieth Day of March, 2007

JON W. DUDAS
*Director of the United States Patent and Trademark Office*

United States Patent
Cunningham

(10) Patent No.: US 6,419,278 B1
(45) Date of Patent: Jul. 16, 2002

(54) AUTOMOTIVE HOSE COUPLING

(75) Inventor: Gail M. Cunningham, Oxford, MI (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/583,420

(22) Filed: May 31, 2000

(51) Int. Cl.[7] ............................ F16L 35/00; F16L 49/00
(52) U.S. Cl. ........................ 285/256; 285/328; 285/382
(58) Field of Search ............................. 285/256, 328, 285/382, 252, 332.4

(56) References Cited

U.S. PATENT DOCUMENTS

| | | | |
|---|---|---|---|
| 4,671,542 A | 6/1987 | Juchnowski | 285/256 X |
| 5,044,671 A | 9/1991 | Chisnell et al. | 285/256 X |
| 5,370,425 A | 12/1994 | Dougherty et al. | 285/256 X |
| 5,417,461 A | 5/1995 | Dougherty et al. | 285/256 |
| 5,775,740 A | 7/1998 | Fukaya et al. | 285/256 |
| 6,095,571 A | 8/2000 | MacDuff | 285/256 |

*Primary Examiner*—Neill Wilson
(74) *Attorney, Agent, or Firm*—Reising, Ethington, Barnes, Kisselle, Learman & McCulloch, P.C.

(57) ABSTRACT

A pressure fluid conduit coupling fitting and method of making same, wherein the nipple tube fitting shank is made of specially grooved rigid material. A conventional elastomeric hose conduit having an open end telescopically receives the grooved fitting shank, and a conventional crimp-collar is sleeved over and shrunk-deformed onto the hose open end to permanently sealably secure the coupled conduit connection. An external circumferential surface of the fitting shank has one or more circumferentially continuous sharp edge external grooves of a shallow depth and predetermined width that are defined by the shank ribs formed between the grooves. The junction of the groove sidewalls with the respectively adjacent shank rib surface defines a circumferentially continuous sharp edge formed generally as a 90° junction of these groove sidewalls and rib surface, plus or minus a few degrees. These specially contoured sharp edge, shallow depth external grooves enhance the fluid sealing capacity (pressure rating) of the coupling connection while reducing the magnitude of collar shrink crimping required, and minimize the chances of hose damage because of over-crimping.

18 Claims, 3 Drawing Sheets